United States Patent
Yin

(10) Patent No.: US 8,149,310 B2
(45) Date of Patent: Apr. 3, 2012

(54) READOUT SYSTEM AND METHOD FOR AN IMAGE SENSOR

(75) Inventor: Ping-Hung Yin, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 454 days.

(21) Appl. No.: 12/425,345

(22) Filed: Apr. 16, 2009

(65) Prior Publication Data

US 2010/0265079 A1    Oct. 21, 2010

(51) Int. Cl.
*H04N 5/335*    (2011.01)
(52) U.S. Cl. .......................... 348/300; 348/303; 348/308
(58) Field of Classification Search .................. 348/294, 348/300–308, 311, 312; 250/208.1
See application file for complete search history.

(56) References Cited

U.S. PATENT DOCUMENTS

| 7,321,110 B2 * | 1/2008 | Okita et al. ................ 250/208.1 |
| 7,630,011 B1 * | 12/2009 | Bock et al. .................... 348/308 |
| 2006/0175534 A1 * | 8/2006 | Barna et al. ................ 250/208.1 |
| 2009/0213259 A1 * | 8/2009 | Su et al. ........................ 348/308 |

* cited by examiner

*Primary Examiner* — Huy K Mai
(74) *Attorney, Agent, or Firm* — Stout, Uxa, Buyan & Mullins, LLP

(57) ABSTRACT

A readout system with enhanced dynamic range for an image sensor is constructed with a pixel circuit and a readout circuit. The pixel circuit includes at least a first amplifier with a first gain and a second amplifier with a second gain for amplifying signals from the image sensor. The readout circuit includes at least a first readout sub-circuit and a second readout sub-circuit for corresponding reading output of the first amplifier and output of the second amplifier respectively.

20 Claims, 4 Drawing Sheets

READOUT SYSTEM AND METHOD FOR AN IMAGE SENSOR

BACKGROUND OF THE INVENTION

1. Field of the Invention

The present invention generally relates to an image sensor, and more particularly to a readout system and method with enhanced dynamic range for the image sensor.

2. Description of Related Art

Semiconductor based image sensors, such as charge-coupled devices (CCDs) or complementary metal-oxide-semiconductor (CMOS) sensors, are widely used, for example, in cameras or camcorders, to convert images of visible light into electronic signals that can then be stored, transmitted or displayed.

With respect to the readout system for an image sensor, the dynamic range is usually limited by the linear scale of an analog-to-digital converter (ADC). One conventional method for enhancing the dynamic range involves increasing the resolution of the ADC. This method, however, tends to increase both the cost and latency. Another conventional method for enhancing the dynamic range seeks to combine long exposure-time image data (for a darker signal) with short exposure-time image data (for a brighter signal). Nevertheless, this method can be complex and time-consuming.

For the reason that conventional readout systems for an image sensor cannot effectively and economically enhance dynamic range, a need has arisen to propose a novel readout system for an image sensor that is capable of acting quickly and is non-complex.

SUMMARY OF THE INVENTION

In view of the foregoing, it is an object of the present invention to provide a readout circuit with enhanced dynamic range for an image sensor that has simple architecture and is capable of acting quickly.

According to one embodiment, the readout circuit comprises a pixel circuit and a readout circuit. The pixel circuit includes at least a first amplifier (e.g., the pixel amplifier) with a first gain and a second amplifier (e.g., the source follower) with a second gain for amplifying signals from the image sensor. A readout circuit includes at least a first readout sub-circuit (e.g., a first correlated double sampling (CDS) circuit) and a second readout sub-circuit (e.g., a second CDS circuit) for corresponding reading output of the first amplifier and output of the second amplifier respectively. In an embodiment, an adder is used to add up output of the first readout sub-circuit and output of the second readout sub-circuit.

DETAILED DESCRIPTION OF THE INVENTION

Figure 1:
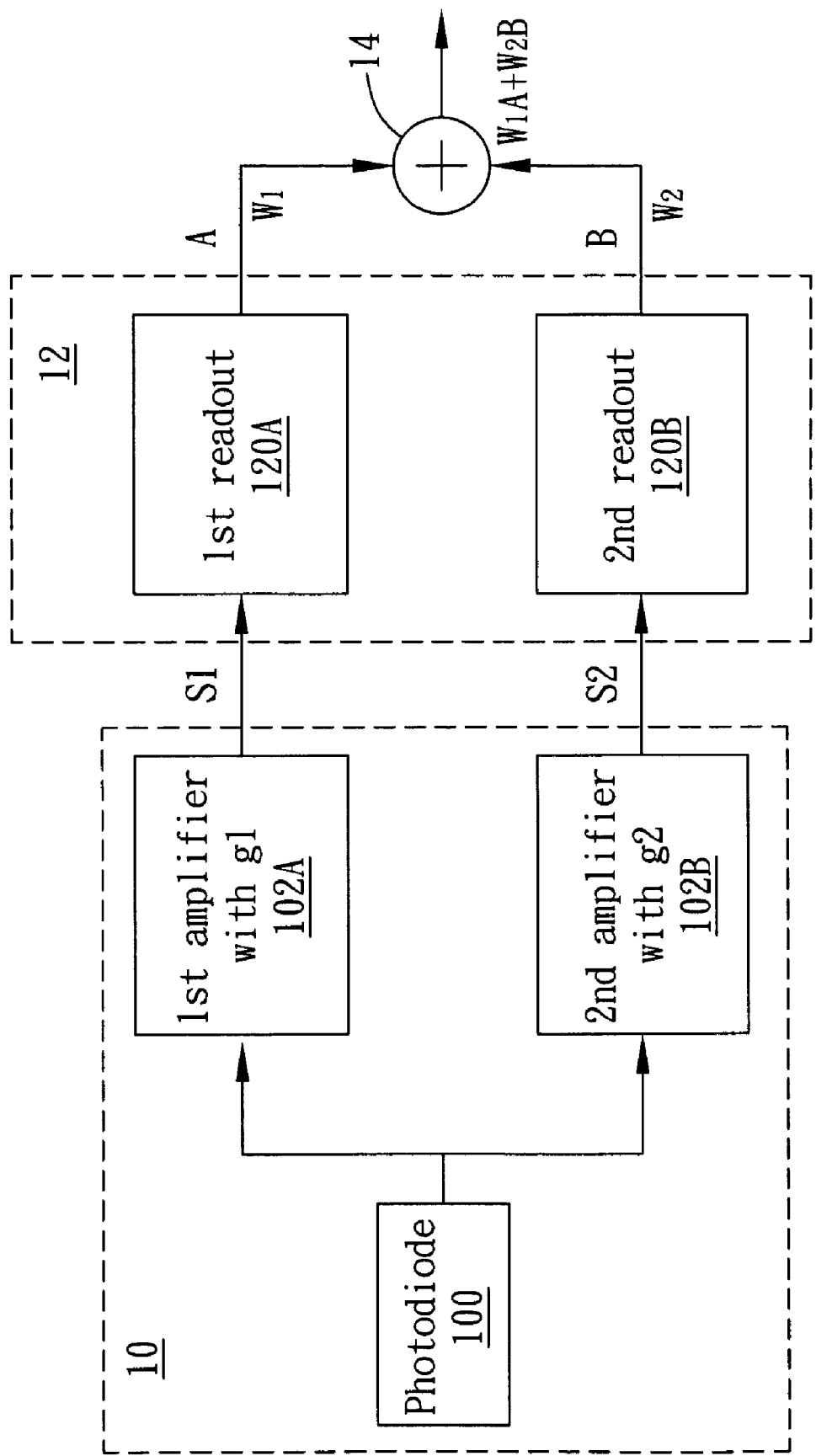
FIG. 1 is a block diagram illustrative of a readout system with enhanced dynamic range for an image sensor according to one embodiment of the present invention.

FIG. 1 is a block diagram illustrative of a readout system with enhanced dynamic range for an image sensor according to one embodiment of the present invention. The image sensor may be, but is not limited to, a charge-coupled device (CCD) or complementary metal-oxide-semiconductor (CMOS) sensor for converting images of visible light into electronic signals. The disclosed readout system may be generally applied to a digital image processing device, such as, but not limited to, a camera or camcorder.

As can be discerned, the exemplary readout system comprises a pixel circuit 10, a readout circuit 12, and an adder 14. In the pixel circuit 10 of the embodiment, signals of a photodiode 100 are amplified within the pixel circuit 10 by at least two amplifiers: a first amplifier 102A with a first gain g1 and a second amplifier 102B with a second gain g2. The first gain g1 is different from the second gain g2. For example, in the embodiment, the first gain g1 is higher than the second gain g2. The output S1 from the first amplifier 102A and the output S2 from the second amplifier 102B are read out by the readout circuit 12, which includes at least two readout sub-circuits: a first readout sub-circuit 120A and a second readout sub-circuit 120B, which correspondingly read the outputs S1 and S2 respectively. The output A of the first readout sub-circuit 120A and the output B of the second readout sub-circuit 120B may be added up, by the adder 14, with respective weightings $w_1$ and $w_2$, resulting in an added output $w_1A+w_2B$. According to the embodiment shown in FIG. 1, as the signals of the photodiode 100 are read out from different paths with different gains, its operation is equivalent to conventionally combining long exposure-time image data with short exposure-time image data, however, with simpler architecture. Therefore, the dynamic range of the readout system can be effectively and economically enhanced.

Figure 2:
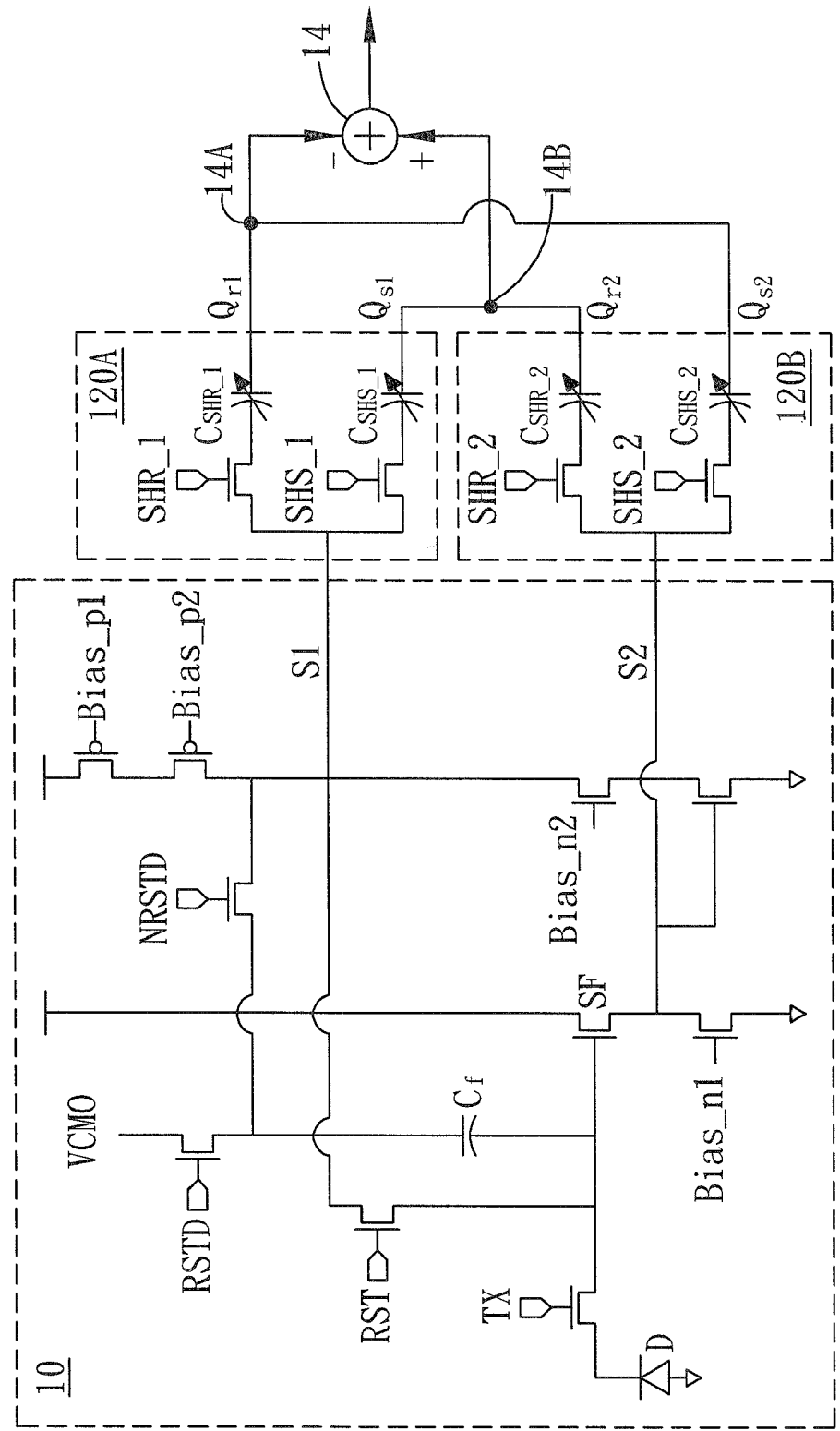
FIG. 2 shows a circuit level implementation of the readout system of FIG. 1 according to the exemplary embodiment of the present invention.

FIG. 2 shows a circuit level implementation of the readout system of FIG. 1 according to the exemplary embodiment of the present invention. In the embodiment, the pixel circuit 10 primarily includes a reset transistor RST, a source follower transistor SF and a transfer transistor TX. In the figure, the transistors and the associated control signals use the same reference characters. Specifically, the reset transistor RST, when it is turned on, is used to reset the photodiode D to a predetermined reset reference voltage. The source follower transistor SF, when it is turned on, is used to buffer the image signals of the photodiode D. The transfer transistor TX, when it is turned on, is used to transfer the image signal of the photodiode D.

The pixel circuit 10 further includes a RSTD (extended reset) transistor, which is connected between a reference voltage $V_{CMO}$ and one end of a feedback capacitor $C_f$. The other end of the feedback capacitor $C_f$ is connected to the gate of the source follower transistor SF. A NRSTD (inverse extended reset) transistor is connected between the first output S1 and the interconnecting node of the feedback capacitor $C_f$ and the RSTD transistor.

In the embodiment, transistors Bias_n1, Bias_n2, Bias_p1 and Bias_p2 are properly biased or sized to provide two voltage outputs: the first output S1 and the second output S2. Specifically, the first output S1 is provided by the pixel amplifier of the pixel circuit 10, and the second output S2 is provided by the source follower transistor SF of the pixel circuit 10. In the embodiment, the pixel amplifier has a gain g1 higher than a gain g2 of the source follower transistor SF.

Still referring to FIG. 2, a first correlated double sampling (CDS) circuit 120A reads out the first output S1, and a second CDS circuit 120B reads out the second output S2. The first CDS circuit 120A includes a first sample-and-hold-reset_signal (SHR) transistor SHR_1 and a first sample-and-hold-image_signal (SHS) transistor SHS_1. The first SHR transistor SHR_1 and the first SHS transistor SHS_1 are coupled to a first SHR capacitor $C_{SHR\_1}$ and a first SHS capacitor $C_{SHS\_1}$ respectively. Specifically, the first SHR transistor SHR_1 is turned on during a resetting period for sampling and holding a reset signal in the first SHR capacitor $C_{SHR\_1}$. The first SHS transistor SHS_1 is turned on during an integrating period for sampling and holding an image signal in the first SHS capacitor $C_{SHS\_1}$. Likewise, the second CDS circuit 120B includes a second SHR transistor SHR_2 and a second SHS transistor SHS_2. The second SHR transistor SHR_2 and the second SHS transistor SHS_2 are coupled to a second SHR capacitor $C_{SHR\_2}$ and a second SHS capacitor $C_{SHS\_2}$ respectively. Specifically, the second SHR transistor SHR_2 is turned on during a resetting period for sampling and holding a reset signal in the second SHR capacitor $C_{SHR\_2}$. The second SHS transistor SHS_2 is turned on during an integrating period for sampling and holding an image signal in the second SHS capacitor $C_{SHS\_2}$.

In the embodiment, the output $Q_{r1}$ of the first SHR capacitor $C_{SHR\_1}$ is electrically coupled to the output $Q_{s2}$ of the second SHS capacitor $C_{SHS\_2}$ at the node 14A, and the output $Q_{s1}$ of the first SHS capacitor $C_{SHS\_1}$ is electrically coupled to the output $Q_{r2}$ of the second SHR capacitor $C_{SHR\_2}$ at the node 14B. The output at the node 14A (i.e., $Q_{r1}+Q_{s2}$) is then subtracted from the output at the node 14B (i.e., $Q_{s1}+Q_{r2}$) by the adder 14. The output of the adder 14 may be expressed as follows:

$$(Q_{s1}+Q_{r2})-(Q_{r1}+Q_{s2})=(Q_{s1}-Q_{r1})+(Q_{r2}-Q_{s2})=[-(Q_{r1}-Q_{s1})]+[+(Q_{r2}-Q_{s2})]$$

The first term of the above expression is associated with the first CDS circuit 120A, and the second term is associated with the second CDS circuit 120B. The minus sign (−) in the first term is due to the first output S1 of the pixel amplifier being out of phase with its input, and the plus sign (+) in the second term is due to the second output S2 of the source follower transistor SF being in phase with its input.

Figure 3:
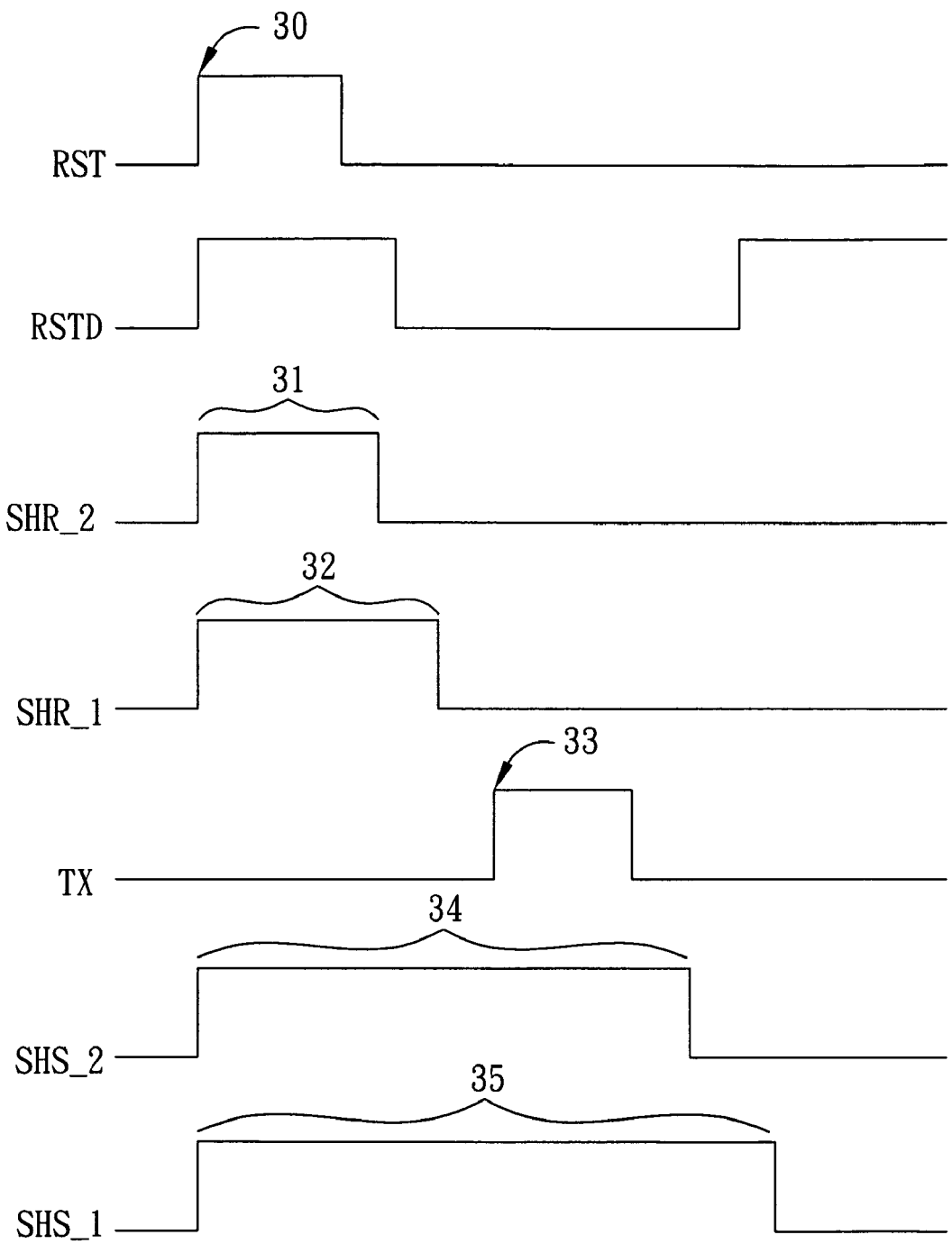
FIG. 3 shows a timing diagram of corresponding signals of the FIG. 2 circuit according to the exemplary embodiment of the present invention.
Figure 4:
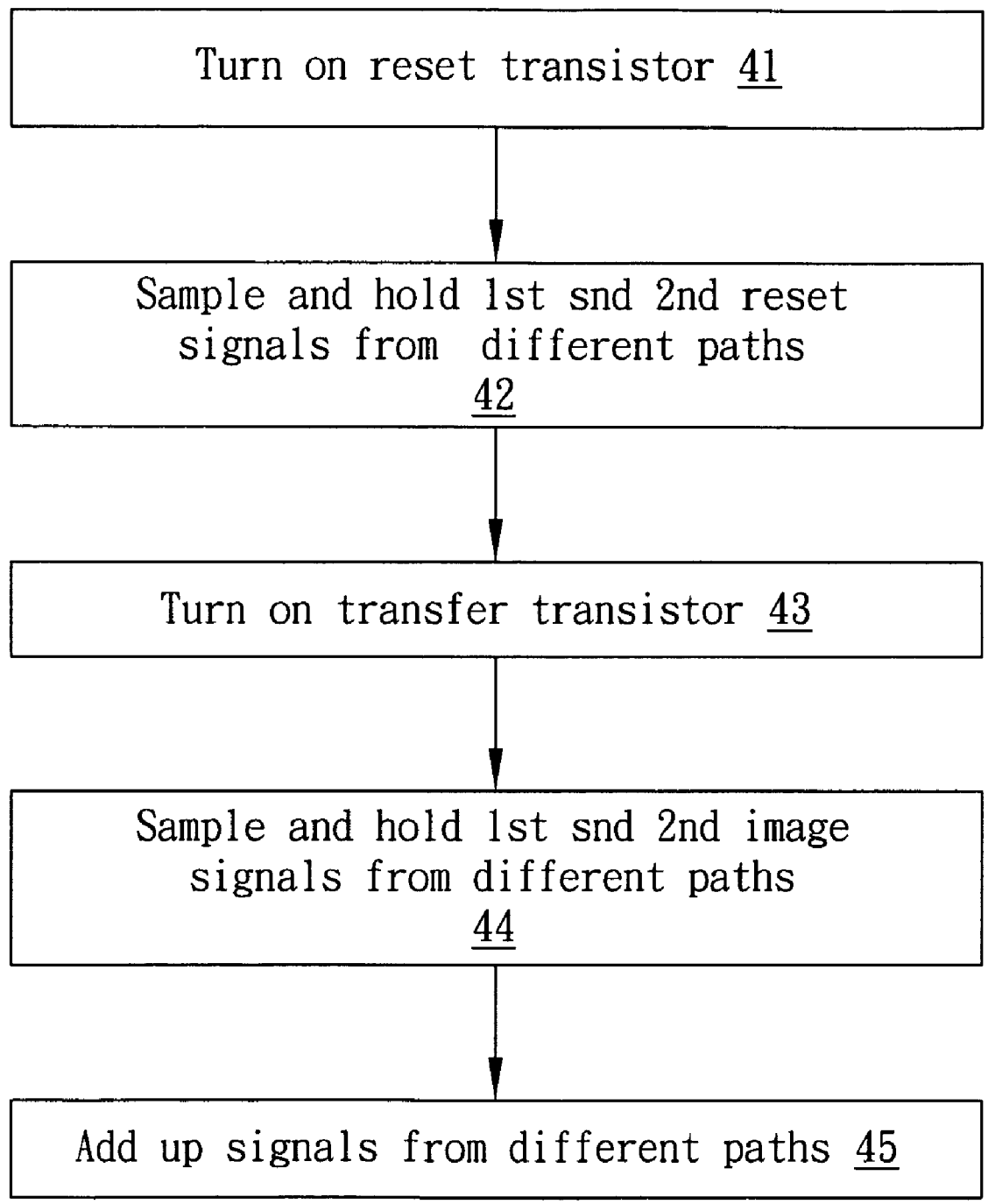
FIG. 4 is a flow diagram illustrating operating steps according to the exemplary embodiment of the present invention.

FIG. 3 shows a timing diagram of corresponding signals of the FIG. 2 circuit according to the exemplary embodiment of the present invention. FIG. 4 is a flow diagram illustrating operating steps according to the exemplary embodiment of the present invention.

In operation, with reference to these figures, the reset transistor RST is first turned on (30) in step 41. Meanwhile, the control signal RSTD, which is a signal that extends the reset signal RST, is also asserted. Subsequently, in step 42 the second reset signal at the second output node S2 is sampled, with the asserted second SHR signal SHR_2 (31), by the second SHR transistor SHR_2 and then held in the second SHR capacitor $C_{SHR\_2}$. The first reset signal at the first output node S1 is also sampled, with the asserted first SHR signal SHR_1 (32), by the first SHR transistor SHR_1 and then held in the first SHR capacitor $C_{SHR\_1}$.

Afterwards, the transfer transistor TX is turned on (33) in step 43. Subsequently, in step 44 the second image signal at the second output node S2 is sampled, with the asserted second SHS signal SHS_2 (34), by the second SHS transistor SHS_2 and then held in the second SHS capacitor $C_{SHS\_2}$. The first image signal at the first output node S1 is also sampled, with the asserted first SHS signal SHS_1 (35), by the first SHS transistor SHS_1 and then held in the first SHS capacitor $C_{SHS\_1}$.

The output $Q_{r1}$ of the first SHR capacitor $C_{SHR\_1}$ may be electrically coupled to the output $Q_{s2}$ of the second SHS capacitor $C_{SHS\_2}$ at the node 14A with respective weightings. The weightings may be obtained, for example, by adjusting the adjustable SHR and/or SHS capacitors. Likewise, the output $Q_{s1}$ of the first SHS capacitor $C_{SHS\_1}$ may be electrically coupled to the output $Q_{r2}$ of the second SHR capacitor $C_{SHR\_2}$ at the node 14B with respective weightings. The output at the node 14A (i.e., $Q_{r1}+Q_{s2}$) is then subtracted from the output at the node 14B (i.e., $Q_{s1}+Q_{r2}$) by the adder 14 at step 45.

According to the embodiment shown in FIGS. 2-4, as the signals of the photodiode D are read out from different paths with different gains, its operation is equivalent to conventionally combining long exposure-time image data with short exposure-time image data, however, with simpler architecture. Therefore, the dynamic range of the readout system can be effectively and economically enhanced.

Although specific embodiments have been illustrated and described, it will be appreciated by those skilled in the art that various modifications may be made without departing from the scope of the present invention, which is intended to be limited solely by the appended claims.

What is claimed is:

1. A readout system for an image sensor, comprising:
   a pixel circuit including at least a first amplifier with a first gain and a second amplifier with a second gain for amplifying signals from the image sensor; and
   a readout circuit including at least a first readout sub-circuit and a second readout sub-circuit for corresponding reading output of the first amplifier and output of the second amplifier respectively.

2. The system of claim 1, wherein the first gain is different from the second gain.

3. The system of claim 1, further comprising at least an adder for adding up output of the first readout sub-circuit and output of the second readout sub-circuit.

4. The system of claim 3, wherein the output of the first readout sub-circuit and the output of the second readout sub-circuit are added with respective weightings.

5. A readout system for an image sensor, comprising:
   a pixel circuit for generating a first output and a second output;
   a first correlated double sampling (CDS) circuit for reading out the first output of the pixel circuit; and
   a second CDS circuit for reading out the second output of the pixel circuit.

6. The system of claim 5, wherein the pixel circuit comprises:
   a reset transistor for resetting a photodiode to a predetermined reset reference voltage;
   a source follower transistor for buffering image signals of the photodiode; and
   a transfer transistor for transferring the image signals of the photodiode.

7. The system of claim 5, wherein the pixel circuit comprises a pixel amplifier and a source follower transistor.

8. The system of claim 7, wherein the first output of the pixel circuit is generated by the pixel amplifier, and the second output of the pixel circuit is generated by the source follower transistor, wherein the pixel amplifier has a gain higher than that of the source follower transistor.

9. The system of claim 5, wherein the first CDS circuit comprises:
   a first sample-and-hold-reset_signal (SHR) transistor for sampling a reset signal from the first output of the pixel circuit;
   a first sample-and-hold-image_signal (SHS) transistor for sampling an image signal from the first output of the pixel circuit; and
   a first SHR capacitor and a first SHS capacitor coupled to the first SHR transistor and the first SHS transistor respectively.

10. The system of claim 9, wherein the second CDS circuit comprises:
   a second SHR transistor for sampling the reset signal from the second output of the pixel circuit;
   a second SHS transistor for sampling an image signal from the second output of the pixel circuit; and
   a second SHR capacitor and a second SHS capacitor coupled to the second SHR transistor and the second SHS transistor respectively.

11. The system of claim 10, further comprising at least a first adder for adding up output reset signals of the first and the second CDS circuits, and a second adder for adding up output image signals of the first and the second CDS circuits.

12. The system of claim 11, wherein the reset signal output of the first CDS circuit is electrically coupled to the image signal output of the second CDS circuit with weightings, and the reset signal output of the second CDS circuit is electrically coupled to the image signal output of the first CDS circuit with weightings.

13. The system of claim 12, wherein the weightings are obtained by adjusting the first and the second SHR capacitors and the first and the second SHS capacitors.

14. A readout method for an image sensor, comprising:
   amplifying signals from the image sensor with a first gain in a first path;
   amplifying the signals from the image sensor with a second gain in a second path;
   reading out the amplified signals from the first path; and
   reading out the amplified signals from the second path.

15. The method of claim 14, wherein the first gain is different from the second gain.

16. The method of claim 14, further comprising a step of adding up the readout amplified signals of the first path and the readout amplified signals of the second path.

17. The method of claim 16, wherein the readout amplified signals of the first path and the readout amplified signals of the second path are added with respective weightings.

18. A readout method for an image sensor, comprising:
   turning on a reset transistor of a pixel circuit;
   sampling and holding a first reset signal at a first output node of the pixel circuit, and sampling and holding a second reset signal at a second output node of the pixel circuit;
   turning on a transfer transistor; and
   sampling and holding a first image signal at the first output node of the pixel circuit, and sampling and holding a second image signal at the second output node of the pixel circuit.

19. The method of claim 18, further comprising a step of electrically coupling the first reset signal output and the second image signal output, and electrically coupling the second reset signal output and the first image signal output.

20. The method of claim 19, wherein the coupling step is performed with respective weightings.

* * * * *